(12) United States Patent
Roy

(10) Patent No.: US 8,806,599 B2
(45) Date of Patent: Aug. 12, 2014

(54) SYSTEMS AND METHODS FOR IMPLEMENTING MULTI-FACTOR AUTHENTICATION

(75) Inventor: Debashis Roy, Bangalore (IN)

(73) Assignee: Symantec Corporation, Mountain View, CA (US)

(*) Notice: Subject to any disclaimer, the term of this patent is extended or adjusted under 35 U.S.C. 154(b) by 59 days.

(21) Appl. No.: 13/493,619

(22) Filed: Jun. 11, 2012

(65) Prior Publication Data
US 2013/0333003 A1    Dec. 12, 2013

(51) Int. Cl.
*H04L 29/06* (2006.01)
*H04L 9/32* (2006.01)

(52) U.S. Cl.
USPC .................................... 726/7; 726/6

(58) Field of Classification Search
None
See application file for complete search history.

(56) References Cited

U.S. PATENT DOCUMENTS

| | | | |
|---|---|---|---|
| 5,944,824 A * | 8/1999 | He | 726/6 |
| 7,886,346 B2 | 2/2011 | Sandhu et al. | |
| 8,443,430 B2 * | 5/2013 | Shah et al. | 726/8 |
| 2005/0268107 A1 | 12/2005 | Harris et al. | |
| 2007/0234408 A1 * | 10/2007 | Burch et al. | 726/6 |
| 2008/0052245 A1 | 2/2008 | Love | |
| 2010/0077457 A1 | 3/2010 | Xu et al. | |
| 2012/0017268 A9 | 1/2012 | Dispensa | |
| 2012/0066753 A1 * | 3/2012 | Pan et al. | 726/7 |
| 2012/0210413 A1 * | 8/2012 | Akula et al. | 726/8 |
| 2013/0055368 A1 * | 2/2013 | Bauckman et al. | 726/7 |
| 2013/0125266 A1 * | 5/2013 | Hiei et al. | 800/294 |
| 2013/0191929 A1 * | 7/2013 | Yin et al. | 726/28 |

OTHER PUBLICATIONS

Sanjay Thakure et al.; Systems and Methods for Managing Offline Authentication; Nov. 11, 2011; U.S. Appl. No. 13/294,932.
Pawar, Vijay; Strong Authentication to Google Apps Using MyOneLogin and Verisign VIP Access Token Introduction; YouTube; Sep. 22, 2009; http://www.youtube.com/watch?v=sFkKNn359ws.

* cited by examiner

*Primary Examiner* — Christopher Revak
(74) *Attorney, Agent, or Firm* — ALG Intellectual Property, LLC

(57) ABSTRACT

A computer-implemented method for implementing multi-factor authentication may include 1) receiving, as part of a secondary authentication system, an authentication request from a client system, 2) redirecting the client system to first perform a first authentication with a primary authentication system in response to receiving the authentication request, 3) receiving an assertion of the first authentication from the client system that demonstrates that the first authentication was successful, and 4) performing a second authentication with the client system in response to receiving the assertion of the first authentication. Various other methods, systems, and computer-readable media are also disclosed.

20 Claims, 7 Drawing Sheets

SYSTEMS AND METHODS FOR IMPLEMENTING MULTI-FACTOR AUTHENTICATION

BACKGROUND

In the digital age, organizations increasingly depend on computing resources to manage data and to provide internal and external services. These organizations may wish to control access to resources within their enterprise environments for a variety of security, confidentiality, administrative, and/or management purposes.

Traditional systems of access control within enterprises have used single-factor authentication systems (such as username and password sign-on systems) for establishing user identities. Unfortunately, the proliferation of various security threats may leave single-factor authentication systems vulnerable to defeat. Accordingly, some organizations may wish to adopt multi-factor authentication within their enterprises to establish user identities.

Unfortunately, organizations may face significant hurdles when attempting to integrate traditional secondary-factor authentication services into their enterprises. For example, some traditional secondary-factor authentication services may require organizations to purchase full infrastructures for implementing the secondary-factor authentication within the enterprise and to install and manage the secondary-factor authentication service as an enterprise application. In other examples, a secondary-factor authentication service provider may require an organization to provide access to sensitive identity data on the enterprise either by syncing the sensitive data to the secondary-factor authentication service provider or by opening enterprise firewalls and allowing third-party applications to access the sensitive data from outside the enterprise. These various traditional approaches may impose significant costs and/or security vulnerabilities on organizations. Accordingly, the instant disclosure identifies and addresses a need for additional and improved systems and methods for implementing multi-factor authentication.

SUMMARY

As will be described in greater detail below, the instant disclosure generally relates to systems and methods for implementing multi-factor authentication by invoking an authentication service in one domain on an attempt to use another authentication service in another domain. In one example, a computer-implemented method for implementing multi-factor authentication may include 1) receiving, as part of a secondary authentication system, an authentication request from a client system, 2) redirecting the client system to first perform a first authentication with a primary authentication system in response to receiving the authentication request, 3) receiving an assertion of the first authentication from the client system that demonstrates that the first authentication was successful, and 4) performing a second authentication with the client system in response to receiving the assertion of the first authentication.

In some examples, receiving the authentication request may include receiving an authentication request initiated by an access manager that is configured to authenticate the client system via the secondary authentication system. In these examples, the access manager may have initiated the authentication request upon intercepting a request for a protected resource from the client system. Additionally, in these examples, the primary authentication system and the access manager may both be installed and operate within a single enterprise network. Furthermore, in these examples, the secondary authentication system may include a server configured to operate outside the single enterprise network.

In addition, the computer-implemented method may also include redirecting the client system to the access manager with an assertion of the second authentication after performing the second authentication. In this example, the access manager may be configured to grant access to a protected resource to the client system after receiving the assertion of the second authentication.

In some embodiments, the primary authentication system may receive an authentication credential from the client system and redirect the client system to the secondary authentication system with the assertion of the first authentication.

In one example, performing the second authentication may include 1) retrieving user identification information from the assertion of the first authentication and 2) performing the second authentication using the user identification information instead of requesting the user identification information from the client system.

In one embodiment, a system for implementing the above-described method may include 1) a receiving module programmed to receive, as part of a secondary authentication system, an authentication request from a client system, 2) a redirection module programmed to redirect the client system to first perform a first authentication with a primary authentication system in response to receiving the authentication request, 3) an assertion module programmed to receive an assertion of the first authentication from the client system that demonstrates that the first authentication was successful, and 4) an authentication module programmed to perform a second authentication with the client system in response to receiving the assertion of the first authentication. The system may also include at least one processor configured to execute the receiving module, the redirection module, the assertion module, and the authentication module.

In some examples, the above-described method may be encoded as computer-readable instructions on a computer-readable-storage medium. For example, a computer-readable-storage medium may include one or more computer-executable instructions that, when executed by at least one processor of a computing device, may cause the computing device to 1) receive, as part of a secondary authentication system, an authentication request from a client system, 2) redirect the client system to first perform a first authentication with a primary authentication system in response to receiving the authentication request, 3) receive an assertion of the first authentication from the client system that demonstrates that the first authentication was successful, and 4) perform a second authentication with the client system in response to receiving the assertion of the first authentication.

As will be explained in greater detail below, by invoking an authentication service in one domain on an attempt to use another authentication service in another domain, the systems and methods described herein may allow the implementation of multi-factor authentication within an enterprise that has already implemented single-factor authentication without removing control of and/or sensitive data relating to the original single-factor authentication system from the enterprise. Furthermore, these systems and methods may allow the addition of a secondary authentication factor without requiring costly and complicated infrastructure changes and maintenance. For example, these systems and methods may allow the addition of a secondary authentication factor simply by reconfiguring the first-factor authentication system within the enterprise to accept and trust authentication requests from the second-factor authentication system. Furthermore, these systems and methods may allow the addition of a secondary authentication factor to a single-factor authentication system of an enterprise without opening access to sensitive enterprise authentication data to outside systems and thereby potentially creating security holes.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
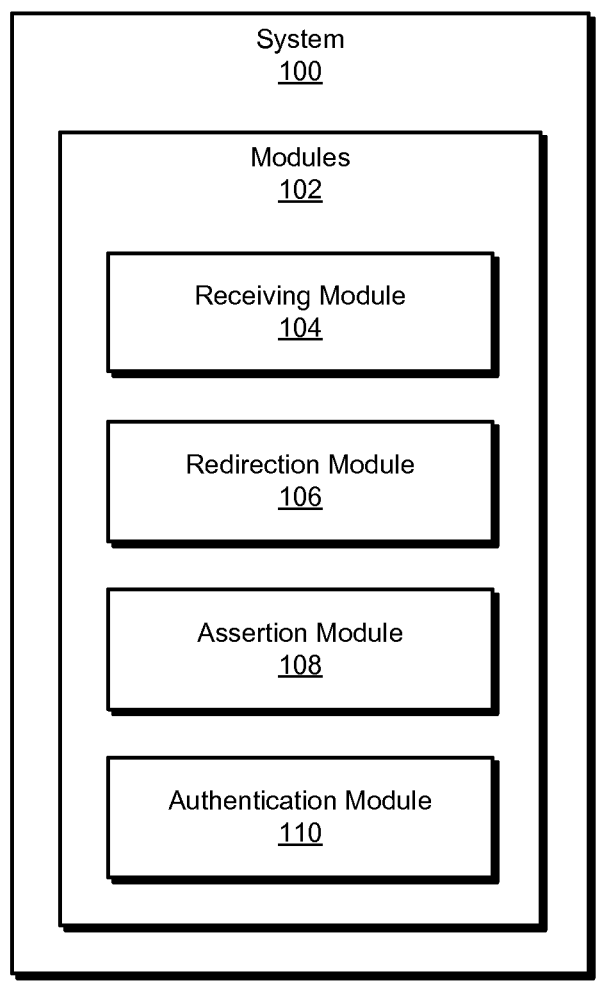
FIG. 1 is a block diagram of an exemplary system for implementing multi-factor authentication.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

Figure 2:
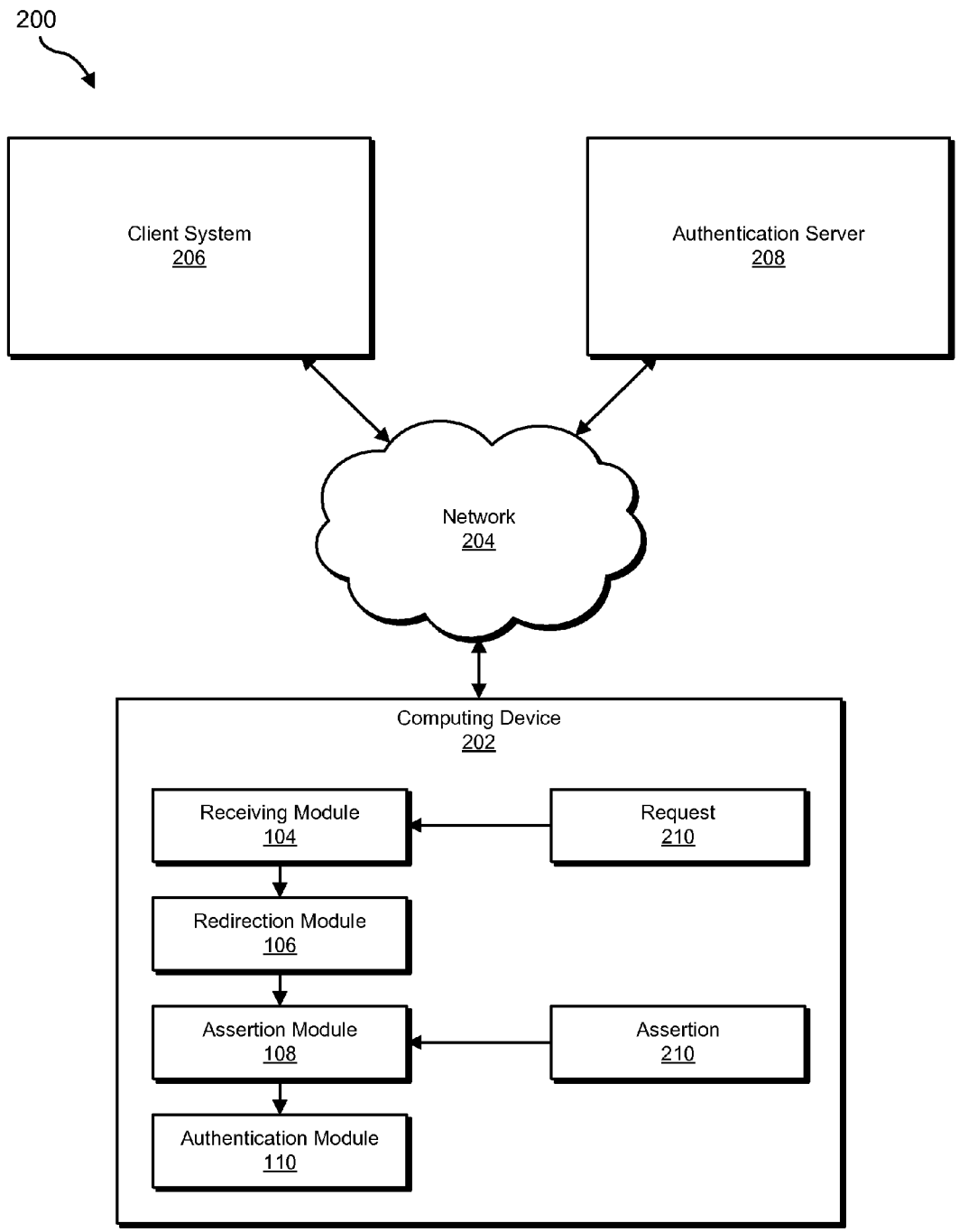
FIG. 2 is a block diagram of an exemplary system for implementing multi-factor authentication.

The following will provide, with reference to FIGS. 1-2, detailed descriptions of exemplary systems for implementing multi-factor authentication. Detailed descriptions of corresponding computer-implemented methods will also be provided in connection with FIG. 3. In addition, detailed descriptions of an exemplary computing system and network architecture capable of implementing one or more of the embodiments described herein will be provided in connection with FIGS. 6 and 7, respectively.

FIG. 1 is a block diagram of an exemplary system 100 for implementing multi-factor authentication. As illustrated in this figure, exemplary system 100 may include one or more modules 102 for performing one or more tasks. For example, and as will be explained in greater detail below, exemplary system 100 may include a receiving module 104 programmed to receive, as part of a secondary authentication system, an authentication request from a client system. Exemplary system 100 may also include a redirection module 106 programmed to redirect the client system to first perform a first authentication with a primary authentication system in response to receiving the authentication request.

In addition, and as will be described in greater detail below, exemplary system 100 may include an assertion module 108 programmed to receive an assertion of the first authentication from the client system that demonstrates that the first authentication was successful. Exemplary system 100 may also include an authentication module 110 programmed to perform a second authentication with the client system in response to receiving the assertion of the first authentication. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202, client system 206, and/or authentication server 208), computing system 610 in FIG. 6, and/or portions of exemplary network architecture 700 in FIG. 7. One or more of modules 102 in FIG. 1 may also represent all or portions of one or more special-purpose computers configured to perform one or more tasks.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a client system 206 and an authentication server 208 via a network 204 (e.g., to authenticate an identity of a user of client system 206 using an authentication factor provided by computing device 202 and an authentication factor provided by authentication server 208).

In one embodiment, one or more of modules 102 from FIG. 1 may, when executed by at least one processor of computing device 202, facilitate computing device 202 in implementing multi-factor authentication. For example, and as will be described in greater detail below, one or more of modules 102 may cause computing device 202 to 1) receive, as part of a secondary authentication system (e.g., on computing device 202), an authentication request 210 from client system 206, 2) redirect client system 206 to first perform a first authentication with a primary authentication system (e.g., on authentication server 208) in response to receiving request 210, 3) receive an assertion 210 of the first authentication (e.g., with authentication server 208) from client system 206 that demonstrates that the first authentication was successful, and 4) perform a second authentication with client system 206 in response to receiving assertion 210 of the first authentication.

Computing device 202 generally represents any type or form of computing device capable of reading computer-executable instructions. Examples of computing device 202 include, without limitation, laptops, tablets, desktops, servers, cellular phones, personal digital assistants (PDAs), multimedia players, embedded systems, combinations of one or more of the same, exemplary computing system 610 in FIG. 6, or any other suitable computing device. In some examples, computing device 202 may represent an authentication server and/or a computing device operating as a part of an authentication service.

Client system 206 generally represents any type or form of computing device capable of reading computer-executable instructions. Examples of computing device 202 include, without limitation, laptops, tablets, desktops, servers, cellular phones, personal digital assistants (PDAs), multimedia players, embedded systems, combinations of one or more of the same, exemplary computing system 610 in FIG. 6, or any other suitable computing device.

Authentication server 208 generally represents any type or form of computing device that is capable of performing one or more authentication operations. Examples of authentication server 208 include, without limitation, application servers and database servers configured to provide various database services and/or run certain software applications.

Network 204 generally represents any medium or architecture capable of facilitating communication or data transfer. Examples of network 204 include, without limitation, an intranet, a wide area network (WAN), a local area network (LAN), a personal area network (PAN), the Internet, power line communications (PLC), a cellular network (e.g., a GSM Network), exemplary network architecture 700 in FIG. 7, or the like. Network 204 may facilitate communication or data transfer using wireless or wired connections. In one embodiment, network 204 may facilitate communication between computing device 202, client system 206, and authentication server 208.

Figure 3:
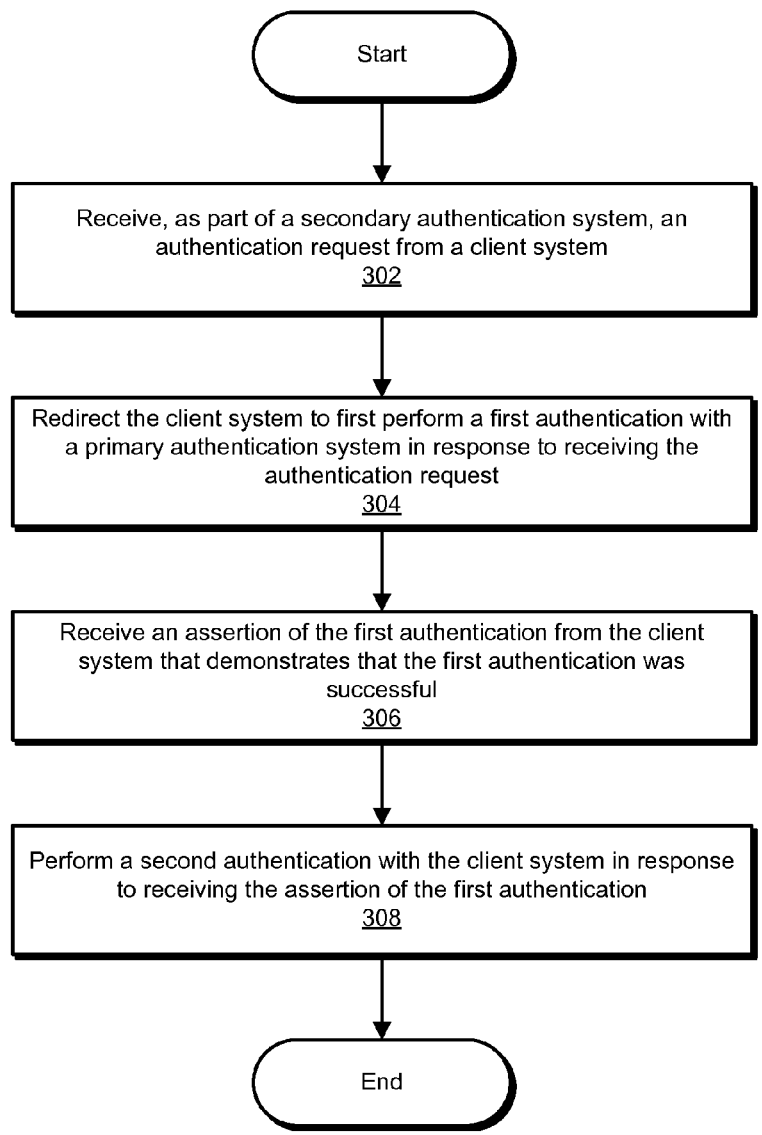
FIG. 3 is a flow diagram of an exemplary method for implementing multi-factor authentication.

FIG. 3 is a flow diagram of an exemplary computer-implemented method 300 for implementing multi-factor authentication. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 610 in FIG. 6, and/or portions of exemplary network architecture 700 in FIG. 7.

As illustrated in FIG. 3, at step 302 one or more of the systems described herein may receive, as part of a secondary authentication system, an authentication request from a client system. For example, at step 302 receiving module 104 may, as part of computing device 202 in FIG. 2, receive, as part of a secondary authentication system (e.g., on computing device 202), an authentication request 210 from client system 206.

As used herein, the phrase "authentication system" may refer to any method of validating and/or confirming the identity of a user and/or client. An authentication system may use any of a variety of credentials. Examples of credentials that may be used for an authentication system include, without limitation, knowledge-based credentials (e.g., something the user knows), token-based credentials (e.g., something the user has), biometric-based credentials (e.g., something the user is), and/or any combination thereof. For example, a knowledge-based credential may include a password, a personal identification number (PIN), and/or a passphrase, a token-based credential may include a one-time password and/or security code generated or received by a mobile and/or desktop computing device (e.g., a smart phone), and a biometric-based credential may include a fingerprint, a voiceprint, and/or an iris scan.

Accordingly, as used herein the phrase "secondary authentication system" may refer to an authentication system that may be used in combination with one or more additional authentication systems to authenticate a user and/or client. In some examples, the phrase "secondary authentication system" may refer to a remote and/or off-site authentication system. In some examples, the phrase "secondary authentication system" may refer to an authentication system introduced to an enterprise that was previously configured with a single-factor authentication system in order to create a multi-factor authentication system.

As used herein, the phrase "authentication request" may refer to any request to an authentication system for authentication. For example, the authentication request may include a Security Assertion Markup Language ("SAML") request. As used herein, the phrase "client system" may refer to any computing device, client software, and/or user agent capable of requesting authentication.

In some examples, receiving the authentication request may include receiving an authentication request initiated by an access manager that is configured to authenticate the client system via the secondary authentication system. As used herein, the phrase "access manager" may refer to any system for adjudicating requests and/or attempts to access resources (e.g., within an enterprise). In some examples, the access manager may initiate the authentication request based on failing to find an active authentication session with the client system. For example, the access manager may have initiated the authentication request upon intercepting a request for a protected resource from the client system. As used herein, the term "resource" may refer to any file, data, document, and/or service. Accordingly, the phrase "protected resource" may refer to any resource access to which is controlled (e.g., by an access manager) based on user identity.

In some examples, the primary authentication system and the access manager may both be installed and operate within a single enterprise network. For example, the primary authentication system and the access manager may operate on a single LAN network and/or on an enterprise private network connecting multiple organizational sites in a single enterprise. In these examples, the secondary authentication system may include a server configured to operate outside the single enterprise network. For example, the enterprise private network and the server of the secondary authentication system may be owned, controlled, managed, maintained, and/or administrated by separate entities. Additionally or alternatively, the enterprise private network and the server of the secondary authentication system may operate within distinct domains. In some examples, the secondary authentication system may include a service configured to operate outside the single enterprise network. Accordingly, an administrator of the single enterprise network may subscribe the single enterprise network to the secondary authentication system without maintaining the secondary authentication system.

Figure 4:
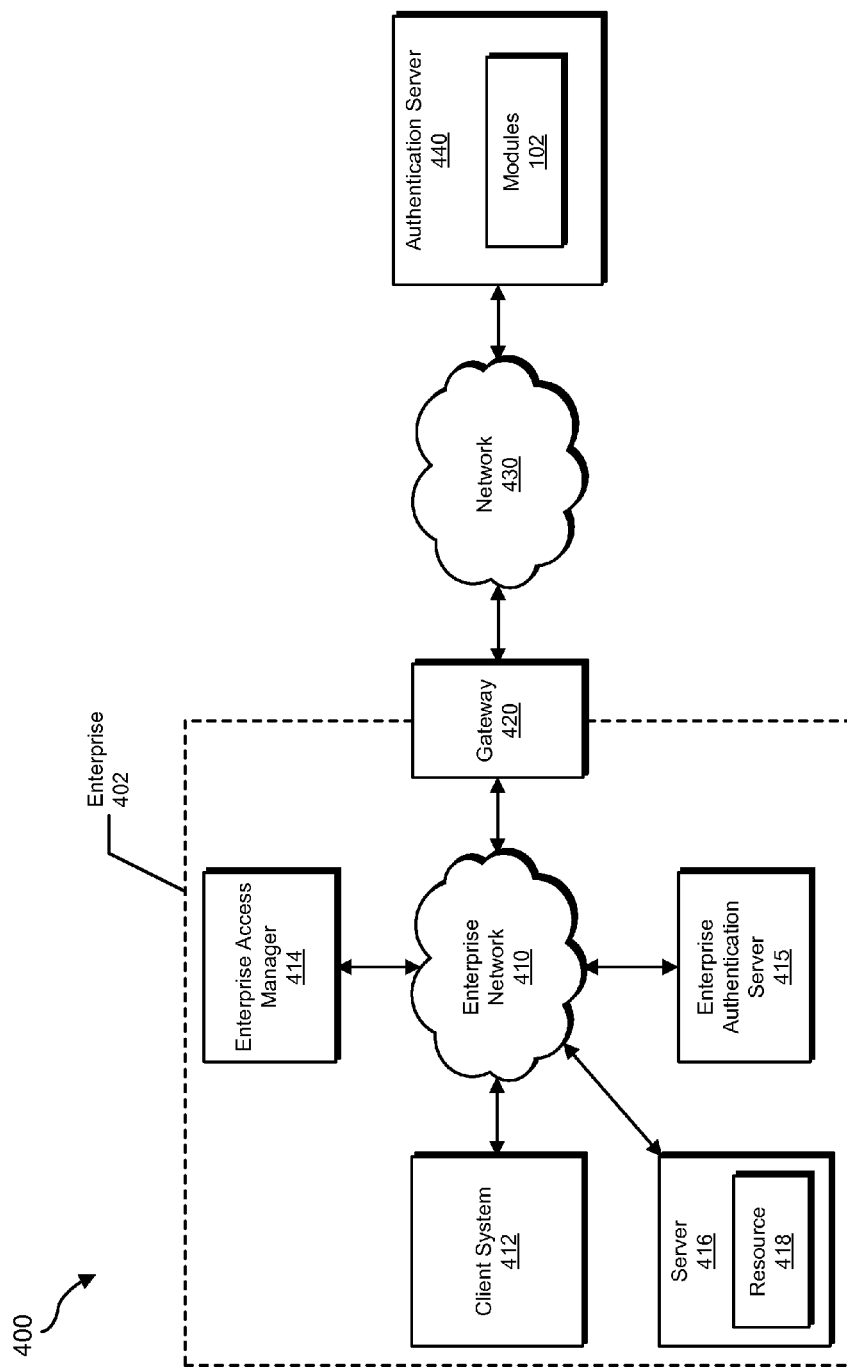
FIG. 4 is a block diagram of an exemplary system for implementing multi-factor authentication.

FIG. 4 illustrates an exemplary system 400 for implementing multi-factor authentication. As shown in FIG. 4, exemplary system 400 may include an enterprise 402 connected to a network 430 via a gateway 420 and an authentication server 440 also connected to network 430. Enterprise 402 may include an enterprise network 410 connecting a client system 412, an enterprise access manager 414, an enterprise authentication server 415, and a server 416. Using FIG. 4 as an example, at step 302 receiving module 104 may, as a part of authentication server 440, receive an authentication request from client system 412. In some examples, the authentication request may have been initiated by enterprise access manager 414. For example, client system 412 may have attempted and/or requested to access a protected resource 418 on server 416. Accordingly, enterprise access manager 414 may have intercepted the attempt and/or identified the request to access resource 418, causing enterprise access manager 414 to initiate an authentication request (e.g., via client system 412) to authentication server 440.

Figure 5:
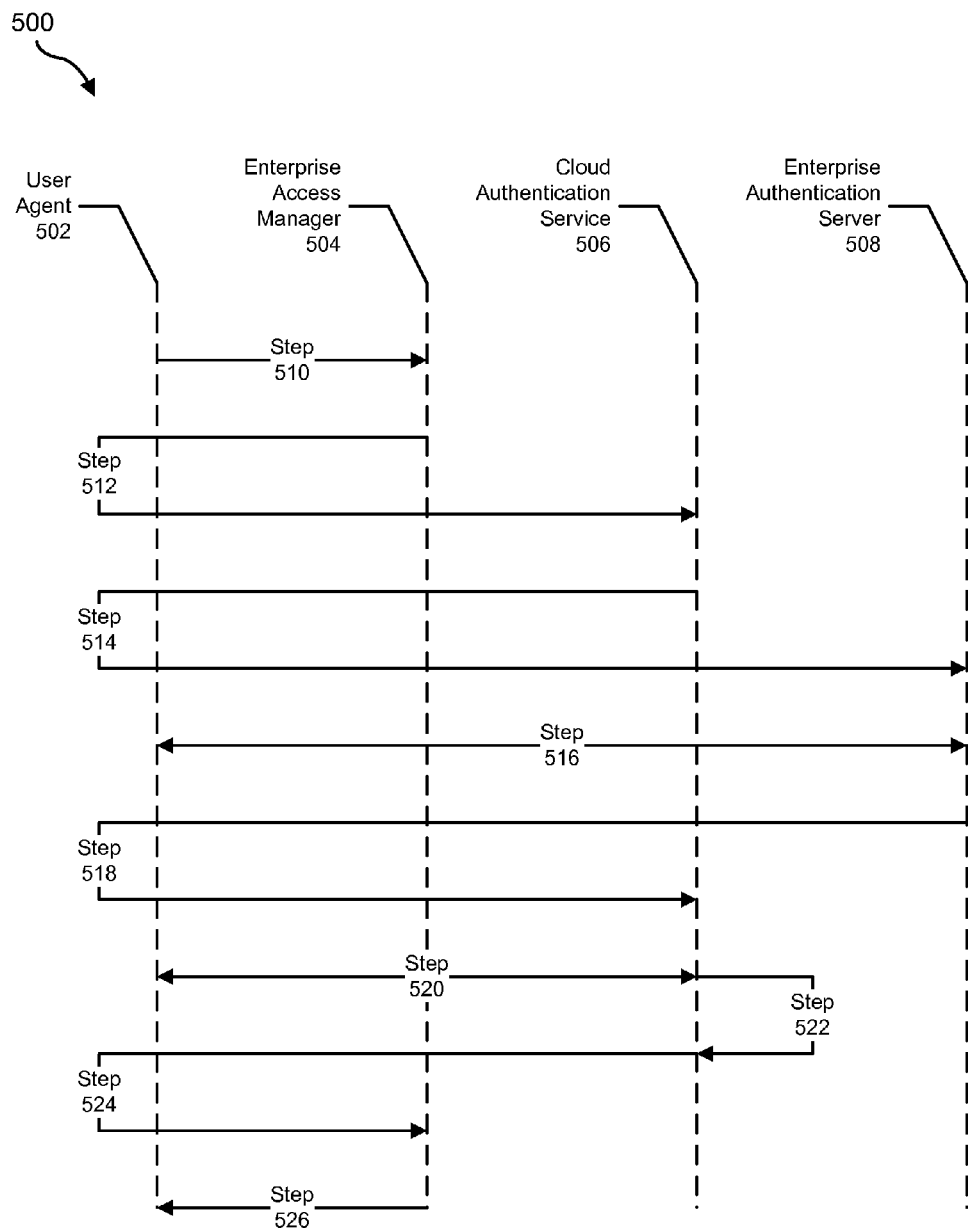
FIG. 5 is an illustration of an exemplary multi-factor authentication.

FIG. 5 illustrates an exemplary multi-factor authentication 500. As shown in FIG. 5, exemplary multi-factor authentication 500 may include a user agent 502, an enterprise access manager 504, a cloud authentication server 506, and an enterprise authentication server 508. Using FIG. 5 as an example, at step 510 enterprise access manager 504 may intercept an attempt by user agent 502 to access a protected resource. At step 512, enterprise access manager 504 may redirect user agent 502 to cloud authentication service 506 with an authentication request (e.g., a SAML request). Accordingly, cloud authentication service 506 may receive the authentication request.

Returning to FIG. 3, at step 304 one or more of the systems described herein may redirect the client system to first perform a first authentication with a primary authentication system in response to receiving the authentication request. For example, at step 304 redirection module 106 may, as part of computing device 202 in FIG. 2, redirect client system 206 to first perform a first authentication with a primary authentication system (e.g., on authentication server 208) in response to receiving request 210.

Redirection module 106 may redirect the client system to perform the first authentication with the primary authentication system in any suitable manner. For example, redirection module 106 may redirect the client system to the primary authentication system with a new authentication request (e.g., a new SAML request).

In some examples, the primary authentication system may then perform the first authentication with the client system. For example, the primary authentication system may receive an authentication credential from the client system and redirect the client system to the secondary authentication with the assertion of the first authentication. As used herein, the term "assertion" may refer to any message capable of asserting authentication. In some examples, the assertion may include a time of the authentication, an issuer of the authentication, a subject of the authentication, and/or a condition of the authentication. As mentioned earlier, authentication systems may use any of a variety of credentials. For example, the authentication credential for the first authentication may include a username and password pair.

Using FIG. 4 as an example, at step 304 redirection module 106 may, as a part of authentication server 440, redirect client system 412 to first perform an authentication with enterprise authentication server 415. In some examples, enterprise authentication server 415 may then perform the authentication with client system 412.

Using FIG. 5 as an example, at step 514 cloud authentication server 506 may redirect user agent 502 with a new authentication request directed to enterprise authentication server 508. At step 516, enterprise authentication server 508 may perform the first authentication with user agent 502.

Returning to FIG. 3, at step 306 one or more of the systems described herein may receive an assertion of the first authentication from the client system that demonstrates that the first authentication was successful. For example, at step 306 assertion module 108 may, as part of computing device 202 in FIG. 2, receive an assertion 210 of the first authentication (e.g., with authentication server 208) from client system 206 that demonstrates that the first authentication was successful.

In some examples, assertion module 108 may also confirm the assertion as valid. For example, the assertion may include a SAML assertion and assertion module 108 may use a holder-of-key method and/or a sender-vouches method to confirm the assertion.

Using FIG. 4 as an example, at step 306 assertion module 108 may, as a part of authentication server 440, receive and confirm an assertion of the first authentication performed between client system 412 and enterprise authentication server 415.

Using FIG. 5 as an example, at step 518 enterprise authentication server 508 may redirect user agent 502 with an assertion of the first authentication performed in step 516. Enterprise authentication server 508 may thereby receive the assertion from user agent 502.

Returning to FIG. 3, at step 308 one or more of the systems described herein may perform a second authentication with the client system in response to receiving the assertion of the first authentication. For example, at step 308 authentication module 110 may, as part of computing device 202 in FIG. 2, perform a second authentication with client system 206 in response to receiving assertion 210 of the first authentication.

Authentication module 110 may perform the second authentication in any suitable manner. In some examples, authentication module 110 may retrieve user identification information from the assertion of the first authentication and perform the second authentication using the user identification information instead of requesting the user identification information from the client system. For example, authentication module 110 may retrieve a username and a domain to which the username applies from the assertion, an email address, etc. In this manner, authentication module 110 may potentially conserve computing resources and speed the authentication process.

As mentioned earlier, in some examples an access manager may have initiated the authentication request directed to the secondary authentication system (e.g., after intercepting a request for a protected resource from the client system). In these examples, authentication module 110 may also redirect the client system to the access manager with an assertion of the second authentication after performing the second authentication. In these examples, the access manager may be configured to grant access to a protected resource to the client system after receiving and confirming the assertion of the second authentication.

Using FIG. 4 as an example, at step 308 authentication module 110 may, as a part of authentication server 440, perform the second authentication with client system 412 in response to receiving and confirming the assertion of the first authentication (e.g., performed with enterprise authentication server 415) from client system 412. Authentication module 110 may also redirect client system 412 to enterprise access manager 414 with the assertion of the second authentication. Enterprise access manager 414 may be configured to grant access to resource 418 upon confirming the second authentication. Accordingly, enterprise access manager 414 may allow client system 412 to access resource 418. While enterprise access manager 414 may only require the second authentication from client system 412, because authentication server 440 requires the first authentication from client system 412, the systems and methods described herein may facilitate multi-factor authentication with minimal disturbance to enterprise 402.

Using FIG. 5 as an example, at step 520 cloud authentication server 506 may perform the second authentication with user agent 502. At step 522, cloud authentication service 506 may map attributes from the second authentication to attributes of an assertion of the second authentication (e.g., a SAML assertion). For example, cloud authentication server 506 may map a user identifier used in the second authentication to a user identifier field within the assertion of the second authentication. At step 524, cloud authentication service 506 may redirect user agent 502 to access manager 504 with the assertion of the second authentication. Enterprise access manager 504 may then, at step 526, confirm the assertion and provide the protected resource to user agent 502.

As explained above, by invoking an authentication service in one domain on an attempt to use another authentication service in another domain, the systems and methods described herein may allow the implementation of multi-factor authentication within an enterprise that has already implemented single-factor authentication without removing control of and/or sensitive data relating to the original single-factor authentication system from the enterprise. Furthermore, these systems and methods may allow the addition of a secondary authentication factor without requiring costly and complicated infrastructure changes and maintenance. For example, these systems and methods may allow the addition of a secondary authentication factor simply by reconfiguring the first-factor authentication system within the enterprise to accept and trust authentication requests from the second-factor authentication system. Furthermore, these systems and methods may allow the addition of a secondary authentication factor to a single-factor authentication system of an enterprise without opening access to sensitive enterprise authentication data to outside systems and thereby potentially creating security holes.

Figure 6:
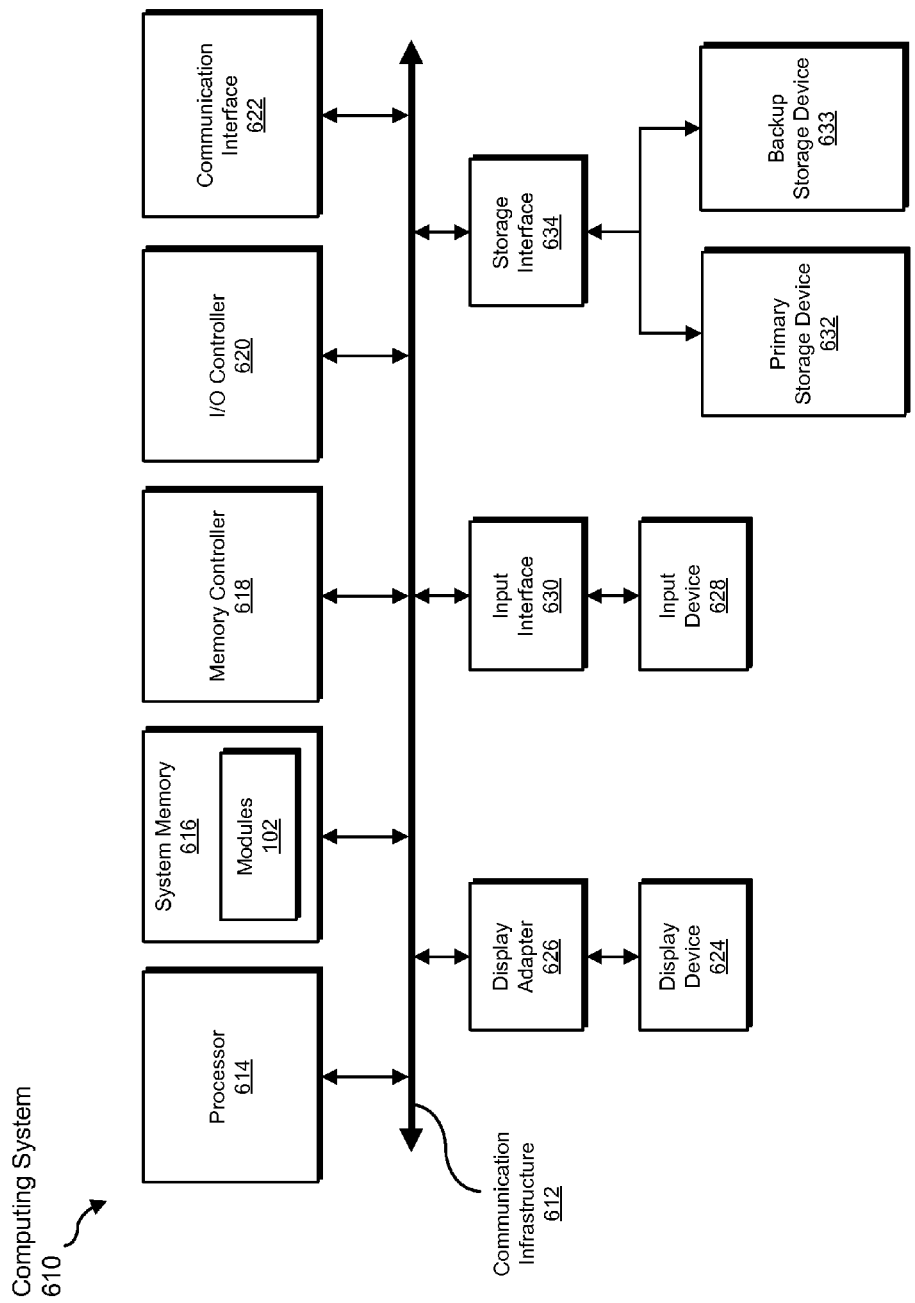
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. For example, all or a portion of computing system 610 may perform and/or be a means for performing, either alone or in combination with other elements, one or more of the receiving, initiating, intercepting, redirecting, performing, retrieving, and granting steps described herein. All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of processing unit capable of processing data or interpreting and executing instructions. In certain embodiments, processor 614 may receive instructions from a software application or module. These instructions may cause processor 614 to perform the functions of one or more of the exemplary embodiments described and/or illustrated herein.

System memory 616 generally represents any type or form of volatile or non-volatile storage device or medium capable of storing data and/or other computer-readable instructions. Examples of system memory 616 include, without limitation, random access memory (RAM), read only memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an ISA, PCI, PCIe, or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and non-transitory-type media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable-storage medium containing the computer program may be loaded into computing system 610. All or a portion of the computer program stored on the computer-readable-storage medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an application specific integrated circuit (ASIC) adapted to implement one or more of the exemplary embodiments disclosed herein.

Figure 7:
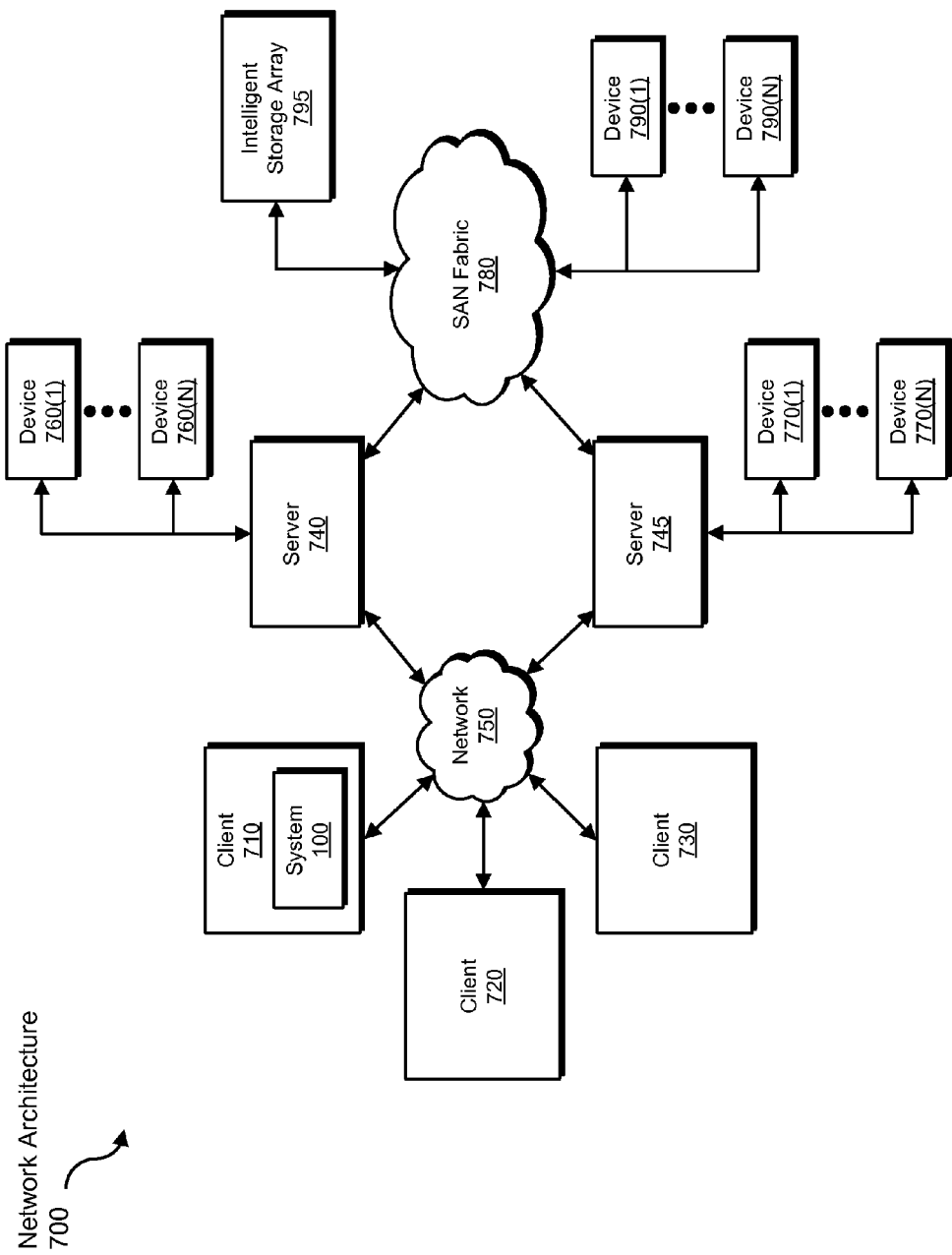
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the receiving, initiating, intercepting, redirecting, performing, retrieving, and granting steps disclosed herein. All or a portion of network architecture 700 may also be used to perform and/or be a means for performing other steps and features set forth in the instant disclosure.

Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a wide area network (WAN), a local area network (LAN), a personal area network (PAN), or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent network-attached storage (NAS) devices configured to communicate with servers 740 and 745 using various protocols, such as NFS, SMB, or CIFS.

Servers 740 and 745 may also be connected to a storage area network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790 (1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an exemplary method for implementing multi-factor authentication.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may transform a computing device into a device for implementing multi-factor authentication. As another example, one or more of the modules described herein may transform an enterprise into an enterprise with multi-factor authentication.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for implementing multi-factor authentication, at least a portion of the method being performed by a computing device comprising at least one processor, the method comprising:
   receiving, as part of a secondary authentication system, an authentication request from a client system;
   redirecting the client system to first perform a first authentication with a primary authentication system in response to receiving the authentication request;
   receiving an assertion of the first authentication from the client system that demonstrates that the first authentication was successful;
   performing a second authentication with the client system in response to receiving the assertion of the first authentication.

2. The computer-implemented method of claim 1, wherein receiving the authentication request comprises receiving an authentication request initiated by an access manager that is configured to authenticate the client system via the secondary authentication system.

3. The computer-implemented method of claim 2, wherein the access manager initiated the authentication request upon intercepting a request for a protected resource from the client system.

4. The computer-implemented method of claim 2, wherein the primary authentication system and the access manager both are installed and operate within a single enterprise network.

5. The computer-implemented method of claim 4, wherein the secondary authentication system comprises a service configured to operate outside the single enterprise network.

6. The computer-implemented method of claim 2, further comprising redirecting the client system to the access manager with an assertion of the second authentication after performing the second authentication.

7. The computer-implemented method of claim 6, wherein the access manager is configured to grant access to a protected resource to the client system after receiving the assertion of the second authentication.

8. The computer-implemented method of claim 1, wherein performing the second authentication comprises:
- retrieving user identification information from the assertion of the first authentication;
- performing the second authentication using the user identification information instead of requesting the user identification information from the client system.

9. The computer-implemented method of claim 1, wherein the primary authentication system receives an authentication credential from the client system and redirects the client system to the secondary authentication system with the assertion of the first authentication.

10. A system for implementing multi-factor authentication, the system comprising:
- a receiving module programmed to receive, as part of a secondary authentication system, an authentication request from a client system;
- a redirection module programmed to redirect the client system to first perform a first authentication with a primary authentication system in response to receiving the authentication request;
- an assertion module programmed to receive an assertion of the first authentication from the client system that demonstrates that the first authentication was successful;
- an authentication module programmed to perform a second authentication with the client system in response to receiving the assertion of the first authentication;
- at least one processor configured to execute the receiving module, the redirection module, the assertion module, and the authentication module.

11. The system of claim 10, wherein the receiving module is configured to receive the authentication request by receiving an authentication request initiated by an access manager that is configured to authenticate the client system via the secondary authentication system.

12. The system of claim 11, wherein the access manager initiated the authentication request upon intercepting a request for a protected resource from the client system.

13. The system of claim 11, wherein the primary authentication system and the access manager both are installed and operate within a single enterprise network.

14. The system of claim 13, wherein the secondary authentication system comprises a service configured to operate outside the single enterprise network.

15. The system of claim 11, wherein the authentication module is further programmed to redirect the client system to the access manager with an assertion of the second authentication after performing the second authentication.

16. The system of claim 15, wherein the access manager is configured to grant access to a protected resource to the client system after receiving the assertion of the second authentication.

17. The system of claim 10, wherein the authentication module is further programmed to perform the second authentication by:
- retrieving user identification information from the assertion of the first authentication;
- performing the second authentication using the user identification information instead of requesting the user identification information from the client system.

18. The system of claim 10, wherein the primary authentication system receives an authentication credential from the client system and redirects the client system to the secondary authentication system with the assertion of the first authentication.

19. A non-transitory computer-readable-storage medium comprising one or more computer-executable instructions that, when executed by at least one processor of a computing device, cause the computing device to:
- receive, as part of a secondary authentication system, an authentication request from a client system;
- redirect the client system to first perform a first authentication with a primary authentication system in response to receiving the authentication request;
- receive an assertion of the first authentication from the client system that demonstrates that the first authentication was successful;
- perform a second authentication with the client system in response to receiving the assertion of the first authentication.

20. The computer-readable-storage medium of claim 19, wherein the one or more computer-executable instructions cause the computing device to receive the authentication request by causing the computing device to receive an authentication request initiated by an access manager that is configured to authenticate the client system via the secondary authentication system.

* * * * *